United States Patent [19]

Carroll

[11] 3,743,951

[45] July 3, 1973

[54] VOLTAGE CONTROLLED UP-DOWN CLOCK RATE GENERATOR

[75] Inventor: John J. Carroll, Indianapolis, Ind.

[73] Assignee: The United States of America as represented by the Secretary of the Navy, Washington, D.C.

[22] Filed: Apr. 26, 1972

[21] Appl. No.: 247,510

[52] U.S. Cl. .................... 328/181, 328/35, 328/127, 328/61

[51] Int. Cl. .............................................. H03k 4/10

[58] Field of Search ........................ 328/181, 36, 35, 328/127, 61

[56] References Cited

UNITED STATES PATENTS

| | | | |
|---|---|---|---|
| 3,047,820 | 7/1962 | Lawton | 328/127 |
| 3,072,856 | 1/1963 | Close | 328/127 |
| 3,119,070 | 1/1964 | Seliger | 328/127 |
| 3,213,369 | 10/1965 | McAuliffe | 328/127 |
| 3,484,593 | 12/1969 | Schmoock | 307/228 |
| 3,588,713 | 6/1971 | Yareck | 328/127 |
| 3,594,649 | 7/1971 | Rauch | 328/61 |

*Primary Examiner*—John W. Huckert
*Assistant Examiner*—R. E. Hart
*Attorney*—R. S. Sciascia and H. H. Losche

[57] ABSTRACT

A voltage controlled clock rate generator having a reversible integrator in combination with an analog to digital conversion means in the output controlled by a direct current (D. C.) analog voltage input and a feedback of the digital output to produce a clock frequency directly proportional to the magnitude of the absolute value of the positive or negative D. C. voltage input with both square wave and triangular wave outputs and containing information as to whether the output frequency is a function of a positive or a negative frequency.

9 Claims, 9 Drawing Figures

VOLTAGE CONTROLLED UP-DOWN CLOCK RATE GENERATOR

BACKGROUND OF THE INVENTION

This invention relates to voltage controlled and clock rate oscillators or generators and more particularly to a clock rate generator of frequency produced proportional to the amplitude in either the positive or negative direction of a D. C. input voltage.

There are known voltage controlled clock rate generators and voltage controlled oscillators whose output frequency is directly proportional to a D. C. input voltage. These voltage controlled oscillators and clock pulse generators will operate linearly over a very wide frequency range (i.e., three decades) as the D. C. input voltage is varied. These voltage controlled oscillators will work only for a single polarity input voltage however. One such known circuit uses an operational amplifier with a four layer diode and a capacitor in parallel in a feedback circuit across the operational amplifier to an input summing point which comprises an inverting integrator. This circuit will produce a sawtooth output voltage frequency proportional to the D. C. input voltage so long as the input voltage is of the correct polarity. Which polarity is correct depends on the orientation of the four layer diode. Aside from this disadvantage of being operative for one or the other polarity, but not both, it also has the disadvantage of being unstable as temperature varies since four layer diode characteristics vary with temperature.

These are other voltage controlled oscillators and voltage controlled clock pulse generators whose output frequency is directly proportional to the input D. C. voltage, which are highly linear and which operate over several decades of frequency by varying the D. C. input, but they work only for one polarity. Sometimes this problem has been solved by using an absolute value generator. The output of an absolute value generator is the absolute value of the input positive or negative voltage which output is always positive. This output is fed into a voltage controlled oscillator which works for positive inputs only. The output frequency of the voltage controlled oscillator is then directly proportional to the absolute value of the input voltage even though the input voltage may be positive or negative. It would be an advantage to accomplish a frequency proportional to input D. C. voltage without the necessity of absolute value generators and without being temperature sensitive.

SUMMARY OF THE INVENTION

In the present invention a reversible integrator is used in combination with an analog-to-digital conversion means with the digital output fed back through an exclusive-OR or coincidence gating means for comparison with an input D. C. voltage, the output of which is an input to the reversible integrator together with the input of D. C. voltage to produce triangular and square waves of a frequency proportional to the D. C. voltage input amplitude. The input of D. C. voltage to the exclusive-OR gate or coincidence gate is through a level detector and the output of the reversible integrator is level detected at a positive level and at a negative level to actuate a one-bit memory or the output may be to a comparator circuit to produce the square wave or clock rate output and feedback. The output of the exclusive-OR gate to the reversible integrator can be coupled to use either a single digital output or both digital outputs may be used to control the reversible integrator. In the embodiment using the combination of a reversible integrator, a comparator, an exclusive-OR gate and a level detector it becomes necessary to include an inverter in one of the couplings to apply the proper digital phase relation for proper operation to acquire the desirable results. Accordingly, it is a general object of this invention to provide a circuit combination to accept D. C. voltage of either polarity to develop triangular and square wave outputs whose clock frequency is directly proportional to the amplitude or absolute value of the D. C. voltage input.

BRIEF DESCRIPTION OF THE DRAWINGS

These and other objects and the attendant advantages, features and uses will become more apparent to those skilled in the art as a more detailed description proceeds when considered along with the accompanying drawings in which.

Figure 1:
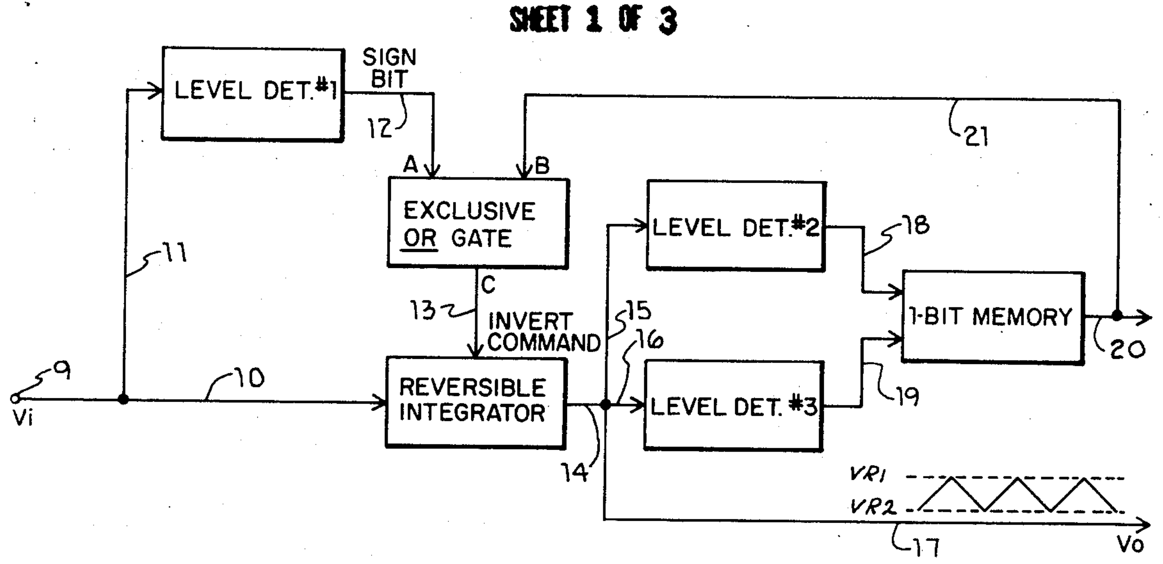
FIG. 1 is a block circuit schematic of the first embodiment of the invention.
Figure 4:
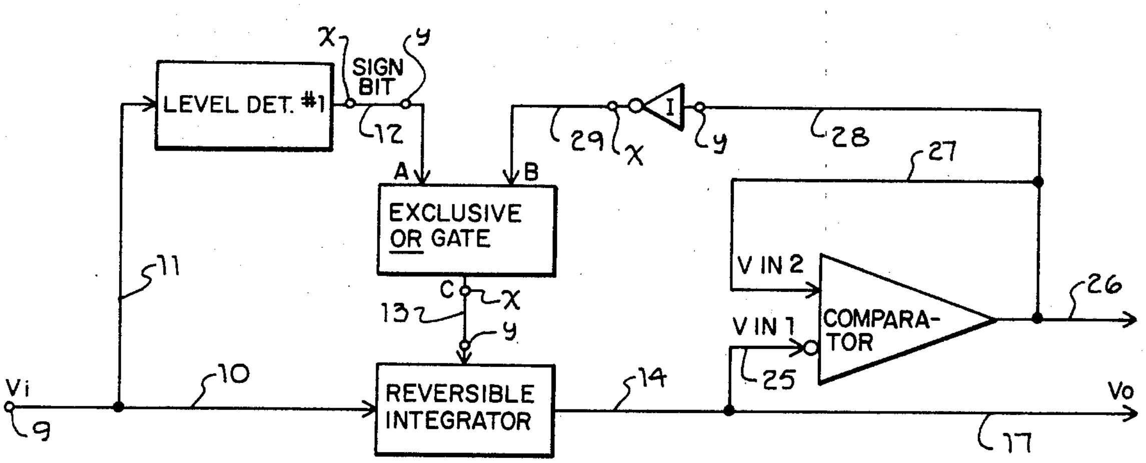
Figure 5:
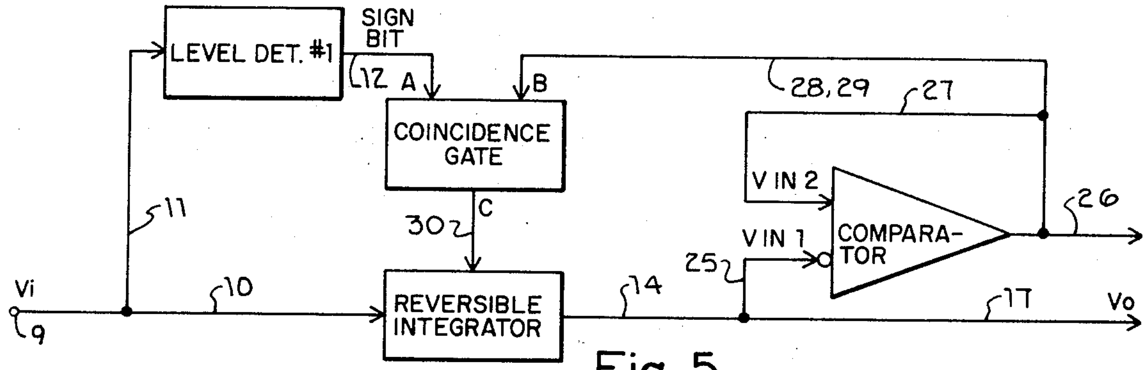
Figure 6:
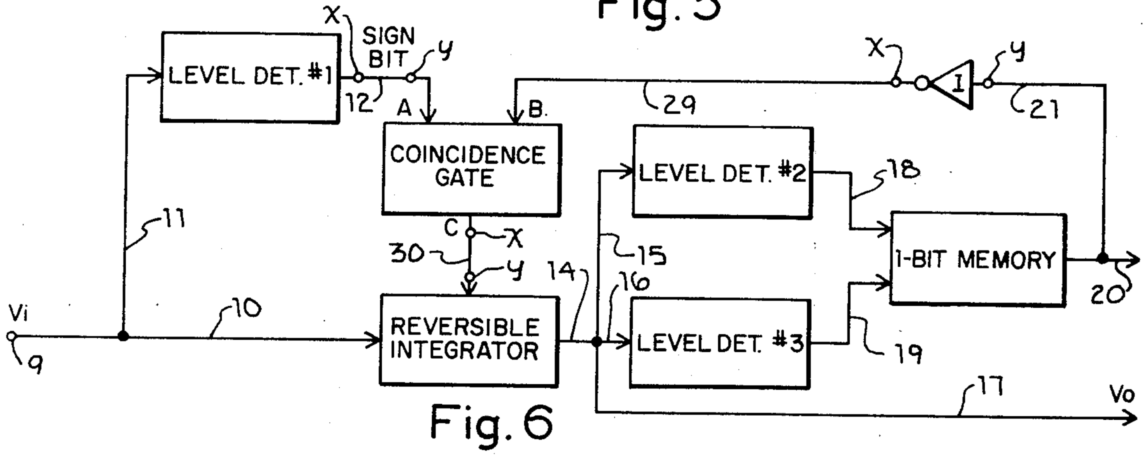
Figure 7:
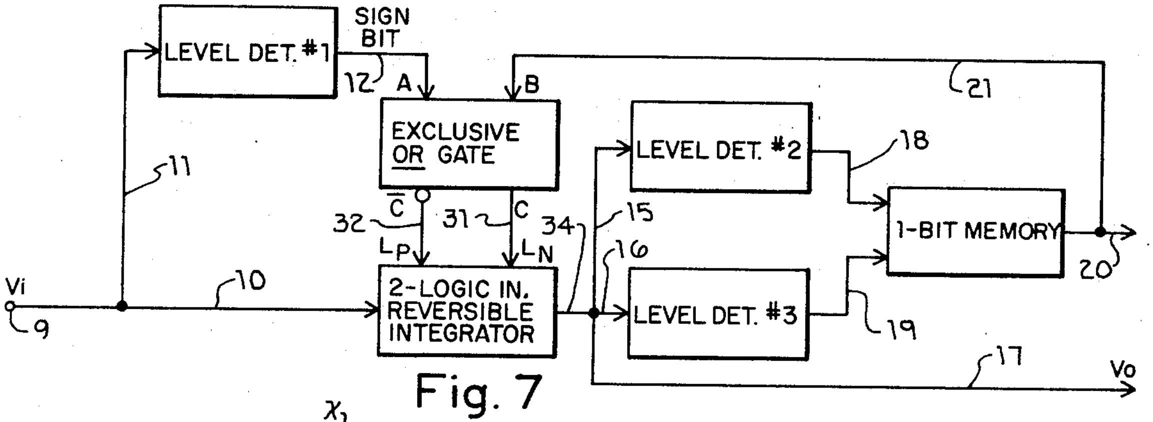
Figure 8:
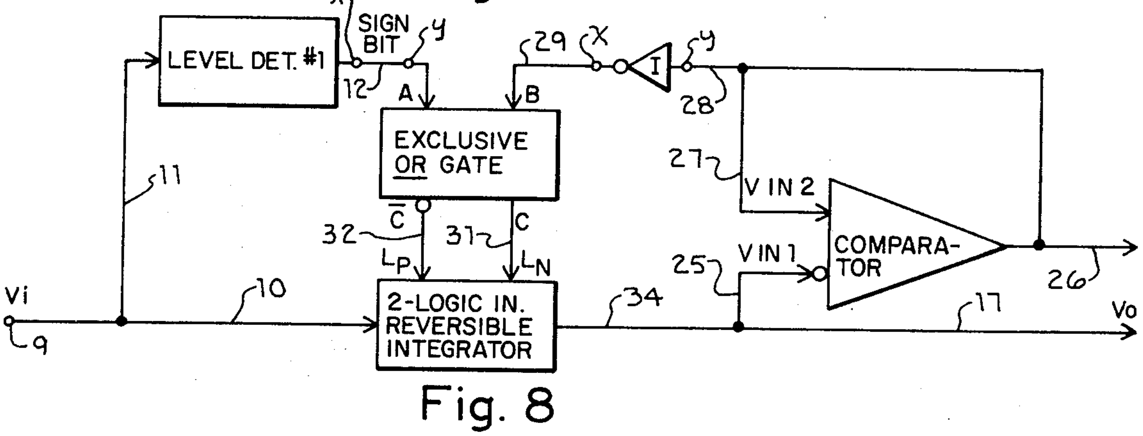

FIGS. *3a* and *3b* are waveform series for various output terminals of the elements illustrated in FIG. 1 for positive input and negative input voltages, respectively;

FIG. 4 is a second embodiment of the invention in block circuit schematic diagram;

FIG. 5 is a modification of the embodiment shown in FIG. 4 illustrated in block circuit schematic;

FIG. 6 is a modification of the embodiment of the invention illustrated in FIG. 1 and shown in block circuit schematic form;

FIG. 7 is a further modification of the invention illustrated in FIG. 1 and illustrated in block circuit schematic; and FIG. 8 is a further modification of the embodiment shown in FIG. 4 and illustrated in block circuit schematic.

DESCRIPTION OF THE PREFERRED EMBODIMENTS

Referring more particularly to FIG. 1 there is illustrated in block circuit schematic, with information being directed as shown by the arrows, having an input D. C. voltage Vi applied to terminal 9 for application by branch conductor 10 to a reversible integrator and by branch conductor 11 to a level detector No. 1. The output of level detector No. 1 is by way of conductor 12 to an exclusive-OR gate circuit illustrated as input A. The output of level detector No. 1 is the "sign bit" which is a logic output. The sign bit is at one logic level when the input Vi is positive and at another logic level when Vi is negative. In this embodiment the sign bit is nominally zero volts when the input Vi is positive and nominally +5 volts, for example, when the input Vi is negative. Since positive logic convention is used to describe this embodiment, the sign bit would be called a logic "1" when it is high or at +5 volts, and a logic "0" when it is low or nominally zero volts. The exclusive-OR gate has inputs A and B and an output C. The output C of the exclusive-OR gate is by way of conductor 13 to the reversible integrator. The exclusive-OR gate output C is a logic 1 when either A or B is a logic 1, but not both; otherwise the output C is a logic 0.

Figure 2:
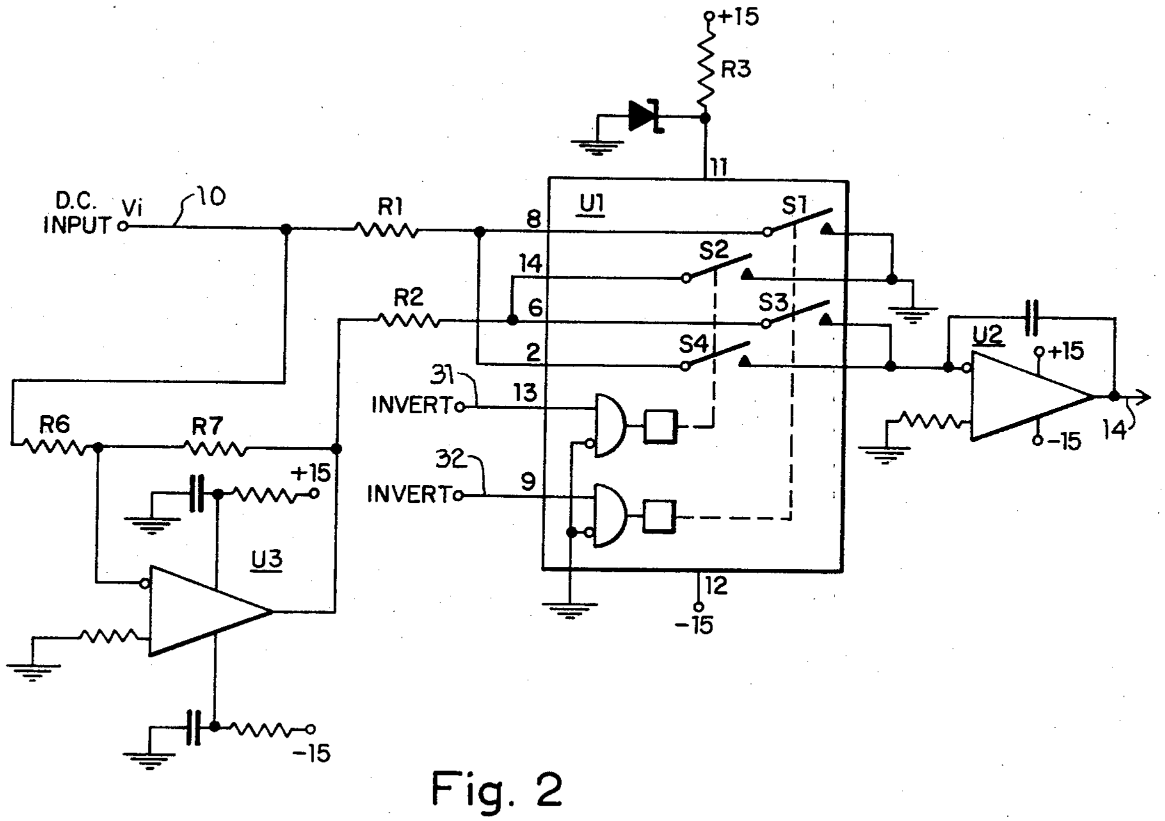
FIG. 2 illustrates the integrated circuit components in schematic form of the reversible integrator of FIG. 1.

Referring more particularly to FIG. 2 there is illustrated a schematic and block diagram of a reversible integrator as used in FIG. 1 and other Figures of the drawing consisting of three integrated circuit components U1, U2, and U3. While U1 is actually a solid state switch, it is illustrated herein as mechanical switches to facilitate the understanding of the device. The reversible integrator uses a double pole single throw field effect transistor (FET) switch U1 which is available from Siliconix under the Part No. DG126BL, an operational amplifier U2 which is available from Harris Semiconductor under the Part No. HA-9–2,600–2, and an operational amplifier U3 which is available from National Semiconductor under the Part No. LM201AF. The circuit of FIG. 2 has two logic inputs, an analog input, and an analog output. It requires a +15V and −15V D. C. supply. The logic inputs are positive logic inputs with +5VDC equal to a logic 1 and ground or zero VDC equal to a logic 0. The two logic inputs 13, 31, and 32, the Invert and $\overline{\text{Invert}}$ inputs, are to be complementary inputs; that is, when one is a logic 1 the other is a logic 0, and vice versa. If the logic inputs are equal, the circuit will not function properly. When the invert command signal is a logic 1 the circuit functions as an inverting integrator, and when it is a logic 0 the circuit will function as a non-inverting integrator. When the Invert command is a logic 1 switches S2 and S4 are closed and open when the Invert command is a logic 0. Likewise, S1 and S3 are closed when $\overline{\text{Invert}}$ is a logic 1 and open when $\overline{\text{Invert}}$ is a logic 0. Since Invert and $\overline{\text{Invert}}$ are complementary, S1 and S3 are open when S2 and S4 are closed, and vice versa.

When the Invert command is a logic 1 the D. C. input Vi is fed to U2 which is connected as an inverting integrator through R1 and S4. When the invert command is a logic 0 the D. C. input Vi is fed to U2 which is connected as an inverting integrator through R6, R7, U3, and S3. U3 is connected as an inverter with unity gain. Thus, when the D. C. input Vi is fed to an inverting integrator through an inverter, the combination acts as a non-inverting integrator.

Switch S1 connects R1 to ground when S4 is open and switch S2 connects R2 to ground when S3 is open. This is done so that R1 will always present the same load to the D. C. input whether the reversible integrator is in the inverting or non-inverting mode. Likewise, R2 will always present the same load to the operational amplifier U3 whether the reversible integrator is in the inverting or non-inverting mode. The time constant of the reversing integrator shown in FIG. 2 is 1 millisecond. Its output is described by the following equations:

$$\frac{dVo}{dt}=\frac{Vi}{1\text{ millisecond}}\text{ when: }\frac{\text{INVERT}=\text{logic "0"}}{\overline{\text{INVERT}}=\text{logic "1"}}$$

$$\frac{dVo}{dt}=\frac{-Vi}{1\text{ millisecond}}\text{ when: }\frac{\text{INVERT}=\text{logic "1"}}{\overline{\text{INVERT}}=\text{logic "0"}}$$

As hereinabove stated, the reversible integrator has an analog voltage input, a logic input or inputs, and an analog voltage output. The logic input C from the exclusive-OR gate is called the "invert command" input. The analog output on 14 is an integration of the input 10 and changes at a rate proportional to Vi when the invert command input is a logic 0 and at a rate proportional to the negative Vi when the invert command input is a logic 1. When the invert command input is a logic 0 the analog output of the reversible integrator changes in a positive direction at a rate proportional to the magnitude of Vi when Vi is positive and in a negative direction at a rate proportional to the magnitude of Vi when Vi is negative. When the invert command C is a logic 1 the analog output of the reversible integrator changes in the negative direction at a rate proportional to the magnitude of Vi when Vi is positive and in the positive direction at a rate proportional to the magnitude of Vi when Vi is negative.

The output 14 of the reversible integrator is applied in common to two level detectors, level detector No. 2 and level detector No. 3, by branch conductors 15 and 16, respectively. The output 14 is also coupled by way of conductor means 17 to provide a triangular wave output Vo from the reversible integrator, as will hereinafter be more fully described. The outputs 18 and 19 of level detectors No. 2 and No. 3, respectively, are applied as control inputs to a one-bit memory having an output 20 to provide square wave clock rate output pulses, as will later be more fully described. The output 20 of the one-bit memory is coupled by way of conductor means 21 as input B to the exclusive-OR gate. The function of level detectors No. 2 and No. 3 is to detect whether the reversible integrator output 14 is outside of either of two voltage limits VR1 and VR2. Level detector No. 2 detects when the reversible integrator output is more positive than its upper limit VR1. Level detector No. 3 detects when the reversible integrator output is more negative than its lower limit VR2. VR1 is more positive than VR2. When the reversible integrator output reaches its upper limit VR1, level detector No. 2 sends a signal to the one-bit memory that the reversible indicator output has reached its upper limit. The one-bit memory changes state from a logic 0 to a logic 1 and sends out a logic 1 indicating that the reversible integrator output should slew downward or in the negative direction toward its lower limit VR2. The one-bit memory continues to put out a logic 1 until the reversible integrator output reaches its lower limit VR2. When the reversible integrator output reaches its lower limit VR2, level detector No. 3 sends a signal to the one-bit memory that the reversible integrator output has reached its lower limit VR2. At that time the one-bit memory changes from the 1 state to the 0 state and sends out a logic 0 indicating that the reversible integrator output should slew upward toward its upper limit VR1. The one-bit memory continues to put out a logic 0 until the reversible integrator output reaches its upper limit at which time level indicator No. 2 sends a signal to the one-bit memory to switch back to the 1 state. When the one-bit memory output is a logic 0, the reversible integrator output slews in the positive direction at a rate proportional to the magnitude or absolute value of the D. C. input voltage Vi independently of whether Vi is positive or negative. Similarly, when the one-bit memory output is a logic 1, the reversible integrator output 14 slews in the negative direction at a rate proportional to the magnitude of the D. C. input voltage Vi independently of whether Vi is positive or negative. The output 14 accordingly will produce triangular waves which may be utilized from the branch conductor output 17.

The output 21 branch conductor from the one-bit memory constituting the input B of the exclusive-OR gate accomplishes exclusive-OR gate operation as follows: If the input B to the exclusive-OR gate is a logic 0 and Vi is positive, then the level detector No. 1 output is a logic 0 as input A and the exclusive-OR gate output C is a logic 0. Since C is the input to the invert command input of the reversible integrator, the invert command input is a logic 0. Therefore, the reversible integrator is integrating Vi which is positive and its output is slewing in the positive direction. If Vi were negative, then A would be a logic 1, B would still be logic 0 and C would be logic 1. Then the reversible integrator would integrate –Vi which would be positive and the integrator output would still slew in the positive direction. If input B were a logic 1 and Vi were positive, A would be a logic 0, C would be a logic 1, and the reversible integrator would integrate – Vi which would be negative since Vi is positive. Therefore the reversible integrator output 14 would slew in the negative direction. Likewise, if Vi were negative and B still a logic 1, A would be a logic 1 and C would be a logic 0. Therefore the reversible integrator would integrate Vi which is negative and the reversible integrator output 14 would slew in the negative direction producing the triangular waves as hereinabove described.

Figure 3A:
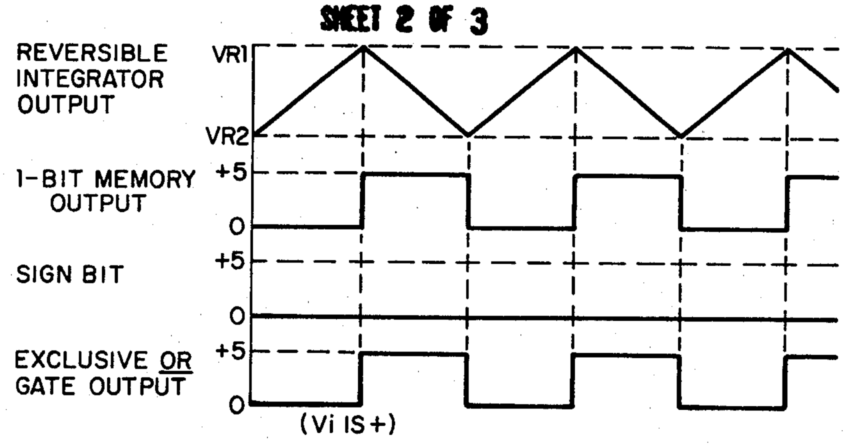
Figure 3B:
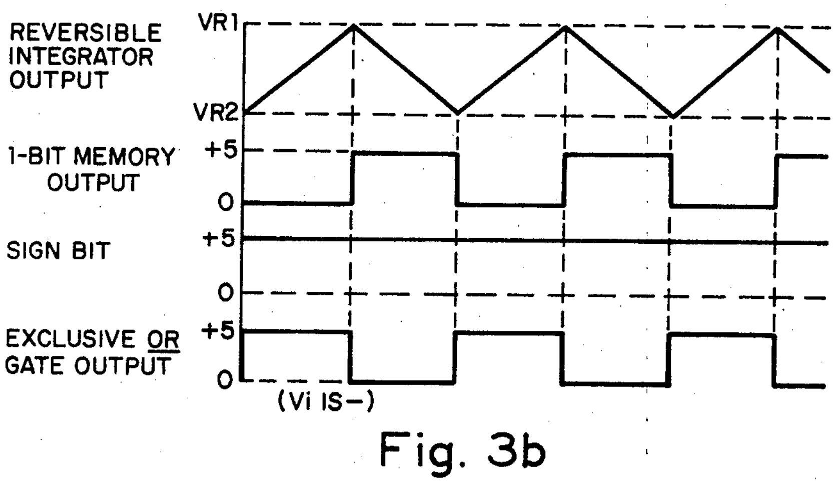

Referring more particularly to FIGS. **3*a* and 3*b* the various outputs of the various elements described hereinabove are shown in graphic form in FIG. 3*a* where the input D. C. voltage Vi is positive and in FIG. 3*b* where the input voltage Vi is negative. The time period of one cycle of the output frequency on 14 is the time required for the reversible integrator output to go from its upper limit VR1 down to its lower limit VR2 and back to its upper limit VR1 again. Since the slope, or rate of change, of the reversible integrator output 14 is directly proportional to the magnitude of the D. C. input voltage Vi, the time required for the reversible integrator output to travel from VR1 to VR2 and back to VR1 is inversely proportional to the magnitude of Vi. Therefore, the output frequency of the reversible integrator output 14 waveform is directly proportional to the magnitude of the D. C. input voltage Vi. The output waveform of the one-bit memory is a square wave, as shown in the second line of FIGS. 3*a* and 3*b* which is at +5 volts, for example, when the reversible integrator is slewing downward and zero volts when the reversible integrator is slewing upward. As hereinbefore stated logic 1 is nominally +5 volts D. C. and logic 0 is nominally zero volts D. C. The square wave output of the one-bit memory is the clock voltage output of the voltage controlled up-down clock rate generator of this invention. The clock frequency is the same frequency as that of the reversible integrator output 14 and therefore directly proportional to the magnitude of the D. C. input voltage Vi. The third line from the top of FIGS. 3*a* and 3*b* shows the sign bit on output 12 of the level detector No. 1** with respect to the triangular wave and clock output waves, and the fourth line shows the output of the exclusive-OR gate as a digital output in square waveform using zero voltage and +5 volts for the purpose of example, although other voltage values may be used where desirable.

Referring more particularly to FIG. 4, where like reference characters refer to like parts, a second embodiment of the invention is disclosed in which the second and third level detectors and the one-bit memory are replaced by a comparator. In this modification the output 14 of the reversible integrator is coupled as the inverted input Vin1 to the comparator by way of conductor 25. The output of the comparator is to any point of use as is desirable by way of conductor 26, one branch conductor 27 of which is coupled in feedback to the non-inverting input Vin2 of the comparator. Branch conductor 28 from output 26 is coupled through an inverter I, the output 29 of which is coupled to the input B of the exclusive-OR gate which could also be used as the clock rate output, if desired. In this modification the comparator serves the same function as the level detectors No. 2 and No. 3 and the one-bit memory in FIG. 1. A comparator is a device which has two analog inputs and a logic output, the analog inputs being Vin1 and Vin2. If Vin2 is more positive than Vin1, the comparator output is at the positive logic level, i.e., more positive or least negative, of the two logic levels. If Vin2 is more negative than Vin1, then the comparator output is at the negative logic level, or logic 0, being the least positive or more negative of the two logic levels. Comparators are standard devices, one source being available from the National Semiconductor's Company under the Part Number LM311. VR1 is the positive logic level, or logic 1, of the comparator output and is also the upper limit of the reversible integrator output. VR2 is the negative logic level, or logic 0, of the comparator output and serves as the lower limit of the reversible integrator output. A logic 1 output of the comparator means that the reversible integrator output should slew upward and a logic 0 output of the comparator means that the reversible integrator should slew downward. This signal has the opposite "sense" as the one-bit memory output of FIG. 1 which is reversed by the inverter I to correct this sense. While the inverter I is shown in the lead 28,29, the sense of the signals could be corrected in either of two other ways as well. The sense of the level detector No. 1 could be inverted or the sense of the output C of the exclusive-OR gate could be inverted. Accordingly, FIG. 4 illustrates taps *x* and *y* in leads 28,29, lead 12, and lead 13, any pair of which could have the inverter inserted for correction of the logic signals to the reversible integrator. Accordingly, the triangular wave would again be produced on output 17 and a clock rate square wave produced on the output 26 in a similar manner to that described for FIG. 1.

Referring more particularly to FIG. 5 the modification of the embodiment shown in FIG. 4 is shown herein, using like reference characters for like parts, with only the substitution of a coincidence gate in the place of the exclusive-OR gate, as shown in FIG. 4. One of the essential features of the invention is the use of a logic device, or combination of logic devices, whose output tells whether its two inputs are equal or unequal. If the two inputs are both logic 0s or both logic 1s then they are equal. If one input is a logic 0 and the other input a logic 1 then they are unequal. The exclusive-OR gate of FIG. 1 is such a device that has an output of logic 1 when its two inputs are unequal and a logic 0 when its two inputs are equal. Another such device is a coincidence gate as shown in FIG. 5 in which the output is a logic 1 when its two inputs are equal and a logic 0 when its two inputs are unequal. For all practical purposes a coincidence gate is the logical equivalent of an exclusive-OR gate with its output inverted. Accordingly, the coincidence gate is used in the circuit as shown in FIG. 5 with a comparator without the use of an inverter, as shown and described for FIG. 4, to obtain the triangular wave and clock pulse waves on outputs 17 and 26.

Referring more particularly to FIG. 6, where like parts are designated by like reference characters used in the other Figures, a coincidence gate is used instead of the exclusive-OR gate of FIG. 1 in combination with the level detectors No. 2 and No. 3 and the one-bit memory circuit. As in FIG. 4 an inverter I is necessary to provide the proper sense of the digital signals. While the inverter I is shown in the conductor 21, it may be used instead in the conductor 12 or conductor 13 by coupling to the terminals *x* and *y*, as described for FIG. 4. The triangular and square clock frequency waves will be produced on the outputs 17 and 20 in the same manner as described for FIGS. 1, 4, and 5.

Referring more particularly to FIG. 7 a circuit and block diagram is illustrated which is similar to the embodiment shown in FIG. 1, using like reference characters for like parts, but modified to this extent. In the circuit embodiment and modification, as shown in FIG. 7, both outputs C and C are used out of the exclusive-OR gate and applied by way of conductors 31 and 32, respectively, to the reversible integrator. In this modification the reversible integrator is a two-logic input reversible integrator having inputs LN and LP coupled to the output C, 31 and $\overline{C}$, 32 of the exclusive-OR gate. The two-logic input reversible integrator acts as a non-inverting integrator when LP is a logic 1 and LN is a logic 0. It acts as an inverting integrator when LP is a logic 0 and LN is a logic 1. The logic output C of the exclusive-OR gate behaves the same as the logic C output in FIGS. 1 and 4. Accordingly, the output 34 of the two-logic input reversible integrator is coupled to the branch conductors 15, 16, and 17, as illustrated in FIG. 1, and will produce the triangular wave on the output 17 and the clock frequency on the output 20 in the same manner as disclosed for FIGS. 1, 4, 5, and 6.

Referring more particularly to FIG. 8, which is a modification of that shown in FIG. 4 and wherein like reference characters are applied to like parts, the exclusive-OR gate, like in FIG. 7, has both C and $\overline{C}$ outputs over conductors 31 and 32 coupled, respectively, to a two-logic input reversible integrator, as in FIG. 7, but passing signals through an analog-to-digital converting means such as a comparator in a similar manner as shown in FIG. 4. As in FIG. 4 comparator output 28 is conducted through an inverter I to the input B of the exclusive-OR gate to correct the sense of the logic as found necessary in FIG. 4. Although the inverter I is shown coupled to the terminals x,y in the conductor 28,29 it could be used instead between the terminals x,y in output 12 of level detector No. 1. The same results will be accomplished by producing a triangular wave on the output 17 and a clock pulse square wave on the output 26, as described for the other figures.

OPERATION

In the operation of the various embodiments and modifications shown and described hereinabove, similar waveforms may be produced for the various outputs of the various embodiments and modifications as shown in the several Figures in a similar manner to those shown in FIGS. 3*a* and 3*b*. To facilitate the understanding of operation reference is made to TABLE I hereinbelow providing four examples of four different combinations of input D. C. voltages Vi to produce digital and analog outputs from the various elements used in the several figures. By following the logic through TABLE I the triangular wave outputs from the reversing integrators can be determined and the clock pulse square waves from the one-bit memory or the comparator can be determined. The + and − symbols in the column for the "Reversing Integrator Out" represent the direction of slew and not the polarity. Accordingly, the operational function should be made clear from TABLE I from which Table waveforms for the various Figures may be readily made, as illustrated by the FIGS. 3*a* and 3*b* for FIG. 1. It is to be understood, however, that the frequency of the outputs 17 and 20 or 17 and 26 will vary proportional to the amplitude, or absolute value, of the D. C. voltage input Vi whether Vi is positive or negative. It is to be understood that this frequency could go to zero as the input D. C. voltage Vi goes to zero. In view of the above description by reference to the several Figures and Table it should be readily apparent that the invention will produce triangular waves on one output and clock pulse square waves on another output simultaneously at a frequency proportional to the absolute value of the input direct current voltage in either polarity of the input D. C. voltage Vi thereby producing output frequency as a function of a positive or negative frequency in accordance

TABLE I

| D.C. input | Level det #1 out | 1-bit memory Out | 1-bit memory Inv Out | Comparator Out | Comparator Inv Out | Exclusive or gate invert command Out | Coincidence gate invert command Out | Reversing integrator Out |
|---|---|---|---|---|---|---|---|---|
| First example: | | | | | | | | |
| + | 0 | 0 | 1 | 1 | 0 | 0 | 0 | + |
| − | 1 | 0 | 1 | 1 | 0 | 1 | 1 | + |
| + | 0 | 1 | 0 | 0 | 1 | 1 | 1 | − |
| − | 1 | 1 | 0 | 0 | 1 | 0 | 0 | − |
| Second example: | | | | | | | | |
| − | 1 | 0 | 1 | 1 | 0 | 1 | 1 | + |
| + | 0 | 1 | 0 | 0 | 1 | 1 | 1 | − |
| − | 1 | 1 | 0 | 0 | 1 | 0 | 0 | − |
| + | 0 | 0 | 1 | 1 | 0 | 0 | 0 | + |
| Third examgle: | | | | | | | | |
| + | 0 | 0 | 1 | 1 | 0 | 0 | 0 | + |
| + | 0 | 1 | 0 | 0 | 1 | 1 | 1 | − |
| − | 1 | 0 | 1 | 1 | 0 | 1 | 1 | + |
| − | 1 | 1 | 0 | 0 | 1 | 0 | 0 | − |
| Fourth example: | | | | | | | | |
| − | 1 | 1 | 0 | 0 | 1 | 0 | 0 | − |
| − | 1 | 0 | 1 | 1 | 0 | 1 | 1 | + |
| + | 0 | 0 | 1 | 1 | 0 | 0 | 0 | + |
| + | 0 | 1 | 0 | 0 | 1 | 1 | 1 | − |

with the input D. C. voltage Vi, and the level detector No. 1 will always produce a sign bit giving information whether the output frequency is to function as a positive or negative frequency as well as information as to whether the D. C. input Vi is positive or negative.

While many further modifications and changes may be made in light of the teaching and inventive concept herein as by using the digital outputs and inverting same to meet the needs of the operation, since the digital sense is not an important feature of the invention, it is to be understood that I desire to be limited in the spirit and concept of my invention only by the scope of the appended claims.

I claim:

1. A voltage controlled up-down clock rate generator comprising:
- a reversible integrator having at least two inputs and an output;
- an analog-to-digital converting means having an input coupled to said reversible integrator output and having an output;
- a level detector having an input and an output;
- an input of direct current voltage, variable in amplitude in the positive and negative polarities, coupled to one input of said reversible integrator and to the input of said level detector; and
- a logic circuit having one input coupled to the output of said level detector and the other input coupled to the output of said analog-to-digital converting means and an output coupled as the other input of said reversible integrator whereby said reversible integrator will produce triangular waves on its output at a frequency proportional to the amplitude of either positive and negative direct current voltage input and square waves at the output of said logic circuit at said frequency providing an up-down clock frequency of uniform amplitude.

2. A voltage controlled up-down clock rate generator as set forth in claim 1 wherein
- said level detector is a first level detector and said analog-to-digital converting means includes second and third level detectors and a one-bit memory circuit with inputs of said second and third level detectors coupled in common to the output of said reversing integrator, the output of each second and third level detector coupled to said one-bit memory, and the output of said one-bit memory circuit constituting said analog-to-digital converting means output whereby said second level detector detects the positive going amplitude of the input thereto to signal and switch said one-bit memory circuit and said third level detector detects the negative going amplitude of the input voltage thereto to signal and switch said one-bit memory circuit keeping said triangular wave output of said reversible integrator within positive and negative amplitude limits.

3. A voltage controlled up-down clock rate generator as set forth in claim 2 wherein
- said logic circuit is an exclusive-OR circuit having a single logic output being coupled to said input of said reversing integrator.

4. A voltage controlled up-down clock rate generator as set forth in claim 2 wherein
- said reversing integrator has a two-logic input and said logic circuit is an exclusive-OR circuit having a two-logic output coupled to said reversing integrator two-logic input.

5. A voltage controlled up-down clock rate generator as set forth in claim 1 wherein
- said analog-to-digital converting means includes a comparator and an inverter, said comparator having one input coupled to the output of said reversing integrator and another input coupled to its own output, and said output being coupled through said inverter and constituting said analog-to-digital converting means output.

6. A voltage controlled up-down clock rate generator as set forth in claim 5 wherein
- said logic circuit consists of an exclusive-OR circuit having a single logic output coupled as one input to said reversing integrator.

7. A voltage controlled up-down clock rate generator as set forth in claim 5 wherein
- said reversing integrator has a two-logic input and said logic circuit is an exclusive-OR circuit having a two-logic output coupled to said reversing integrator two-logic input.

8. A voltage controlled up-down clock rate generator as set forth in claim 1 wherein
- said analog-to-digital converting means consists of a comparator with two inputs and an output, one input being coupled in feedback from its output, and
- said logic circuit consists of a coincidence gate.

9. A voltage controlled up-down clock rate generator as set forth in claim 1 wherein
- said analog-to-digital converting means is a comparator circuit and said logic circuit is an exclusive-OR circuit and one of said couplings of said level detector and said exclusive-OR circuit, said comparator and said exclusive-OR circuit, and said exclusive-OR circuit and said reversing integrator includes an inverter.

* * * * *